United States Patent [19]

Ohno

[11] Patent Number: 5,303,089
[45] Date of Patent: Apr. 12, 1994

[54] OBJECTIVE LENS DRIVE UNIT

[75] Inventor: Takehide Ohno, Yokohama, Japan

[73] Assignee: Ricoh Company, Ltd., Tokyo, Japan

[21] Appl. No.: 68,247

[22] Filed: May 27, 1993

[30] Foreign Application Priority Data

Jun. 3, 1992 [JP] Japan .................................. 4-142674

[51] Int. Cl.⁵ .............................................. G02B 7/02
[52] U.S. Cl. .................... 359/814; 359/824; 369/44.16
[58] Field of Search ............... 359/813, 814, 823, 824; 369/44.15, 44.16, 44.18, 44.24

[56] References Cited

U.S. PATENT DOCUMENTS

| | | | |
|---|---|---|---|
| 4,607,913 | 8/1986 | Jansen | 369/44.16 |
| 4,796,248 | 1/1989 | Ozaki et al. | 359/823 |
| 4,998,802 | 3/1991 | Kasuga et al. | 359/814 |
| 5,023,861 | 6/1991 | Champagne et al. | 369/44.15 |
| 5,128,806 | 7/1992 | Ohno | 359/813 |
| 5,132,850 | 7/1992 | Hagiwara | 359/813 |
| 5,140,572 | 8/1992 | Kibune et al. | 369/44.14 |
| 5,191,484 | 3/1993 | Yeon et al. | 359/824 |
| 5,208,703 | 5/1993 | Ikegame et al. | 359/813 |
| 5,212,673 | 5/1993 | Honda | 369/44.15 |

FOREIGN PATENT DOCUMENTS 6313139 7/1986 Japan .

OTHER PUBLICATIONS

Hirabayashi, Kengo, "Yoke for Optical Filing Pickup", Press Technique, vol. 28, No. 10, pp. 58–59, 1990.

*Primary Examiner*—Loha Ben
*Attorney, Agent, or Firm*—Cooper & Dunham

[57] ABSTRACT

In an objective lens drive unit, a magnetic circuit is constructed by two outer yokes, two inner yokes, a magnet and an upper yoke. The magnetic circuit applies a magnetic field to each of electromagnetic coils disposed in a bobbin having an objective lens. The outer yokes and the inner yokes are integrally formed with an actuator base. A through hole is formed in the upper yoke composed of one sheet metal such that a light beam transmitted through the objective lens passes through the through hole. Each of the inner yokes is inserted into the through hole and both end portions of the upper yoke are arranged and fixed to the two outer yokes such that an arranging state of the upper yoke is stabilized. Thus, the upper yoke is simply, reliably and precisely fixed to the inner and outer yokes.

9 Claims, 9 Drawing Sheets

OBJECTIVE LENS DRIVE UNIT

BACKGROUND OF THE INVENTION

1. Field of the Invention

The present invention relates to an objective lens drive unit for moving an objective lens for converging a light beam to an optical information recording medium such as an optical disk and a magnetooptic disk to record and reproduce information.

2. Description of the Related Art

An optical pickup device generally records and reproduces information from an optical information recording medium such as an optical disk, a magnetooptic disk, etc. The optical pickup device has an objective lens for irradiating a light beam emitted from a light source onto the optical information recording medium as a light spot. The optical pickup device also has an objective lens drive unit for moving the objective lens with respect to the optical information recording medium in focusing and tracking directions.

With respect to the objective lens drive unit, there is a proposed technique for integrally pressing an actuator base and inner and outer yokes. When this proposed technique is used, the actuator base can be precisely manufactured with low cost.

To make an actuator base portion compact, the bending height of an inner yoke portion with respect to the actuator base portion is reduced to shorten a length of the actuator base portion. The inner yoke portion is bent and stretched to increase a height of the inner yoke portion.

When the height of the inner yoke portion is increased by stretch in the above general technique, no upper end of the inner yoke portion is flat and an accuracy in height of the inner yoke portion is reduced. Therefore, an upper yoke is arranged in a slanting state with respect to upper ends of an outer yoke portion and the inner yoke portion so that no upper yoke is suitably fixed to the inner and outer yoke portions.

SUMMARY OF THE INVENTION

It is therefore an object of the present invention to provide an objective lens drive unit for simply, reliably and precisely fixing an upper yoke to inner and outer yokes.

The above object of the present invention can be achieved by an objective lens drive unit comprising a bobbin having an objective lens and supported such that the bobbin can be displaced; an electromagnetic coil disposed in the bobbin; two sets of inner and outer yokes integrally formed with a base; a magnet disposed in each of the outer yokes such that the magnet is opposed to the electromagnetic coil; an upper yoke connected to upper ends of the inner and outer yokes and formed by one sheet metal; and a through hole formed in the upper yoke such that a light beam transmitted through the objective lens passes through the through hole; the base, the sets of inner and outer yokes, the magnet and the upper yoke forming a magnetic circuit for applying a magnetic field to the electromagnetic coil in association with each other; and the upper yoke being arranged and fixed onto an upper end face of each of the two outer yokes.

In this objective lens drive unit, each of the inner yokes is formed to be higher than each of the outer yokes, and a linear portion engaged with each of the two inner yokes is formed in a circumferential portion of the through hole of the upper yoke.

The linear portion of the through hole is formed as a recessed portion such that a bottom portion of the linear portion has a length approximately equal to a width of each of the inner yokes.

The two inner yokes are formed such that an opposite distance between these two inner yokes is increased toward upper ends of the inner yokes from base portions thereof, and each of the inner yokes comes in elastic contact with a circumferential portion of the through hole.

A tapering portion is formed in an edge portion of the through hole such that the tapering portion is widened on an arranging side of an optical information recording medium.

The upper yoke has a positioning portion engaged with an upper end portion of each of the outer yokes and has a slit hole into which an upper end portion of each of the inner yokes is fitted and inserted.

In the above objective lens drive unit, the upper yoke is formed by one sheet metal and is arranged and fixed onto only an upper end face of each of the two outer yokes irrespective of the inner yokes. Accordingly, arranging and fixing states of the upper yoke are stabilized and the upper yoke can be positioned accurately and reliably in a height direction thereof.

Each of the inner yokes is set to be higher than each of the outer yokes and a linear portion engaged with each of the two inner yokes is formed in the through hole of the upper yoke. Accordingly, the upper yoke is easily positioned by the inner yokes and is easily assembled.

The linear portion is formed as a recessed portion such that a bottom portion of the linear portion has a length approximately equal to a width of each of the inner yokes. Accordingly, the upper yoke can be simply positioned in a width direction of each of the inner yokes and can be easily assembled.

The two inner yokes are formed such that the distance between these two inner yokes is increased toward upper ends thereof, and each of the inner yokes comes in elastic contact with a circumferential portion of the through hole of the upper yoke. Accordingly, the upper and inner yokes are close to each other so that loss of electromotive force of a magnetic circuit is reduced.

Light reflected on an optical information recording medium is transmitted outward by the tapering portion disposed in an end portion of the through hole through which a light beam passes. Accordingly, no unnecessary reflected light is easily transmitted below the upper yoke.

The upper yoke is positioned by engaging an upper end portion of each of the outer yokes with the positioning portion of the upper yoke. Further, an inclination of the inner yoke is restricted by fitting and inserting an upper end portion of each of the inner yokes into the slit hole of the upper yoke. Accordingly, the upper yoke can be easily and precisely assembled.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an objective lens drive unit in the present invention will next be described in detail with reference to the accompanying drawings.

Figure 1:
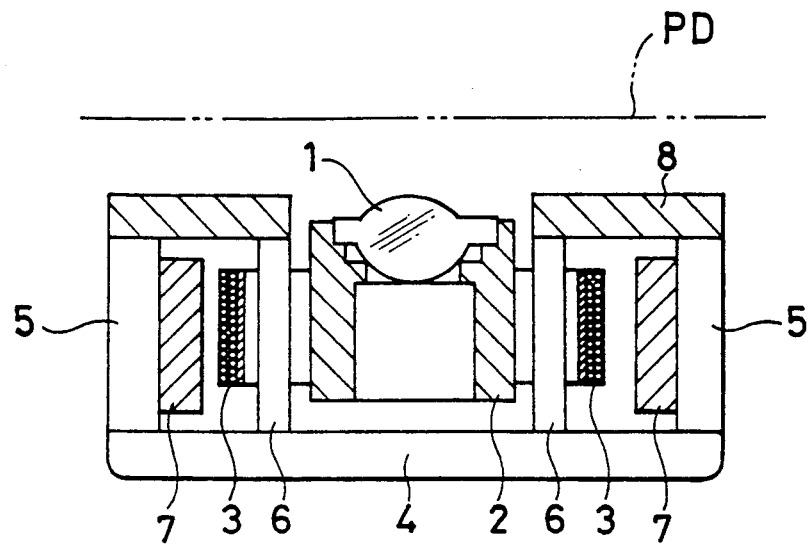
FIG. 1 is a view showing the schematic construction of a general objective lens drive unit.

FIG. 1 is a view showing the schematic construction of a general objective lens drive unit. In FIG. 1, an objective lens 1 converges a light beam to irradiate the light beam onto an optical disk PD as a light spot. A bobbin 2 supports the objective lens 1 in an upper portion thereof. An electromagnetic coil 3 is arranged around an outer circumference of the bobbin 2. An actuator base 4 is integrally disposed with two sets of outer yokes 5 and inner yokes 6. A magnet 7 is fixed to an outer yoke 5 such that this magnet 7 is opposed to the electromagnetic coil 3. An upper yoke 8 is arranged such that upper ends of the outer yoke 5 and an inner yoke 6 are connected to the upper yoke 8.

A magnetic circuit for applying a magnetic field to the electromagnetic coil 3 is constructed by the upper yoke 8, the inner yoke 6, the outer yoke 5, the actuator base 4 and the magnet 7. The objective lens 1 is moved through the bobbin 2 in focusing and tracking directions.

In the objective lens drive unit, magnetic fluxes generated by the magnet 7 are divided and directed to the upper yoke 8 and the actuator base 4 so that it is possible to prevent the yokes from being saturated with respect to the magnetic fluxes.

In Press Technique (Vol. 28, No. 10, 1990), there is a proposed technique for integrally pressing the actuator base and the yokes. When this proposed technique is used, the actuator base can be precisely manufactured with low cost.

Figure 2:
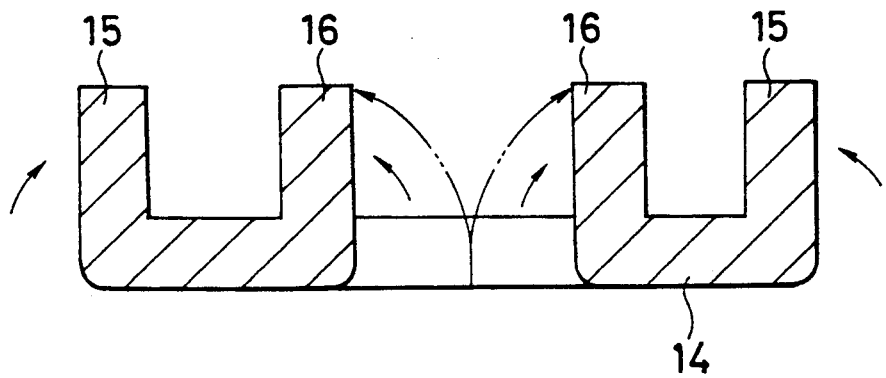
FIG. 2 is a view for explaining molding of inner and outer yokes.

In this pressing technique, as shown in FIG. 2, both side portions of an outer yoke portion 15 are bent such that these side portions rise with respect to an actuator base portion 14. Further, a central portion of an inner yoke portion 16 is bent such that this central portion rises with respect to the actuator base portion 14. Therefore, when the inner yoke portion 16 is formed by only bending processing such that this inner yoke portion 16 has a height equal to that of the outer yoke portion 15, it is necessary to secure a portion providing this height in an central portion of the actuator base portion 14 so that a length of the actuator base portion 14 is increased.

Figure 3A:
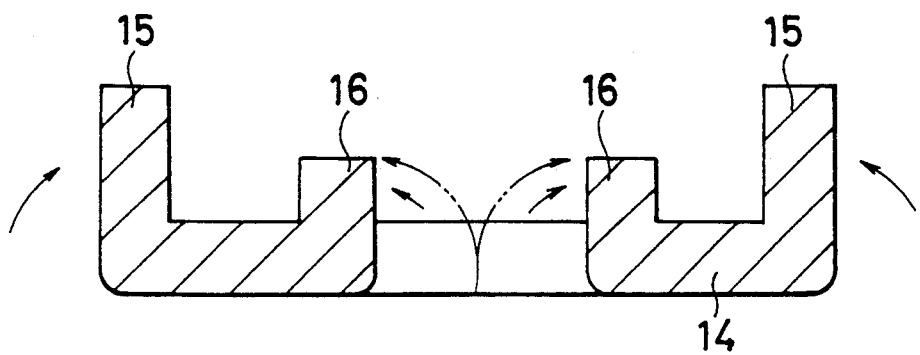
FIGS. 3a and 3b are views for explaining molding of the inner and outer yokes.
Figure 3B:
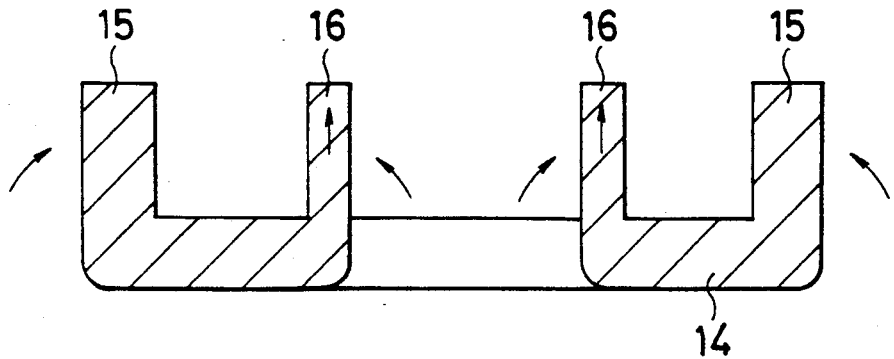

Therefore, the actuator base portion 14 is made compact as shown in FIGS. 3a and 3b. Namely, in FIG. 3a, a bending height of the inner yoke portion 16 with respect to the actuator base portion 14 is reduced to shorten the length of the actuator base portion 14. In FIG. 3b, the inner yoke portion 16 is bent and stretched to increase a height of the inner yoke portion 16. Then, the inner yoke portion 16 is identical in thickness with the actuator base portion 14 when the inner yoke portion 16 is merely bent, and the thickness of the inner yoke portion 16 is reduced during which the inner yoke portion 16 is stretched.

Figure 4:
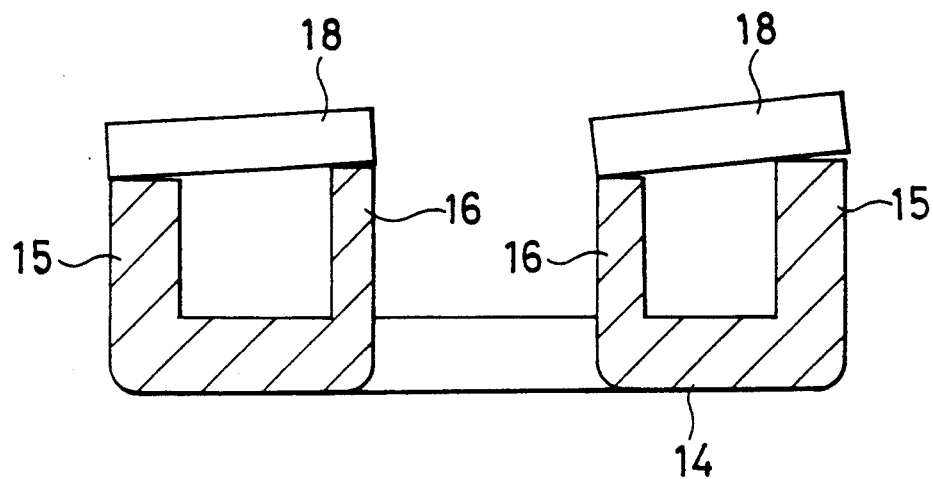
FIG. 4 is a view for explaining an arranging state of an upper yoke.

When the height of the inner yoke portion 16 is increased by stretch in the above general technique, no upper end of the inner yoke portion 16 is flat and an accuracy in height of the inner yoke portion 16 is reduced. Therefore, as shown in FIG. 4, an upper yoke 18 is arranged in a slanting state with respect to upper ends of the outer yoke portion 15 and the inner yoke portion 16 so that no upper yoke 18 is suitably fixed to the inner and outer yoke portions.

Figure 6:
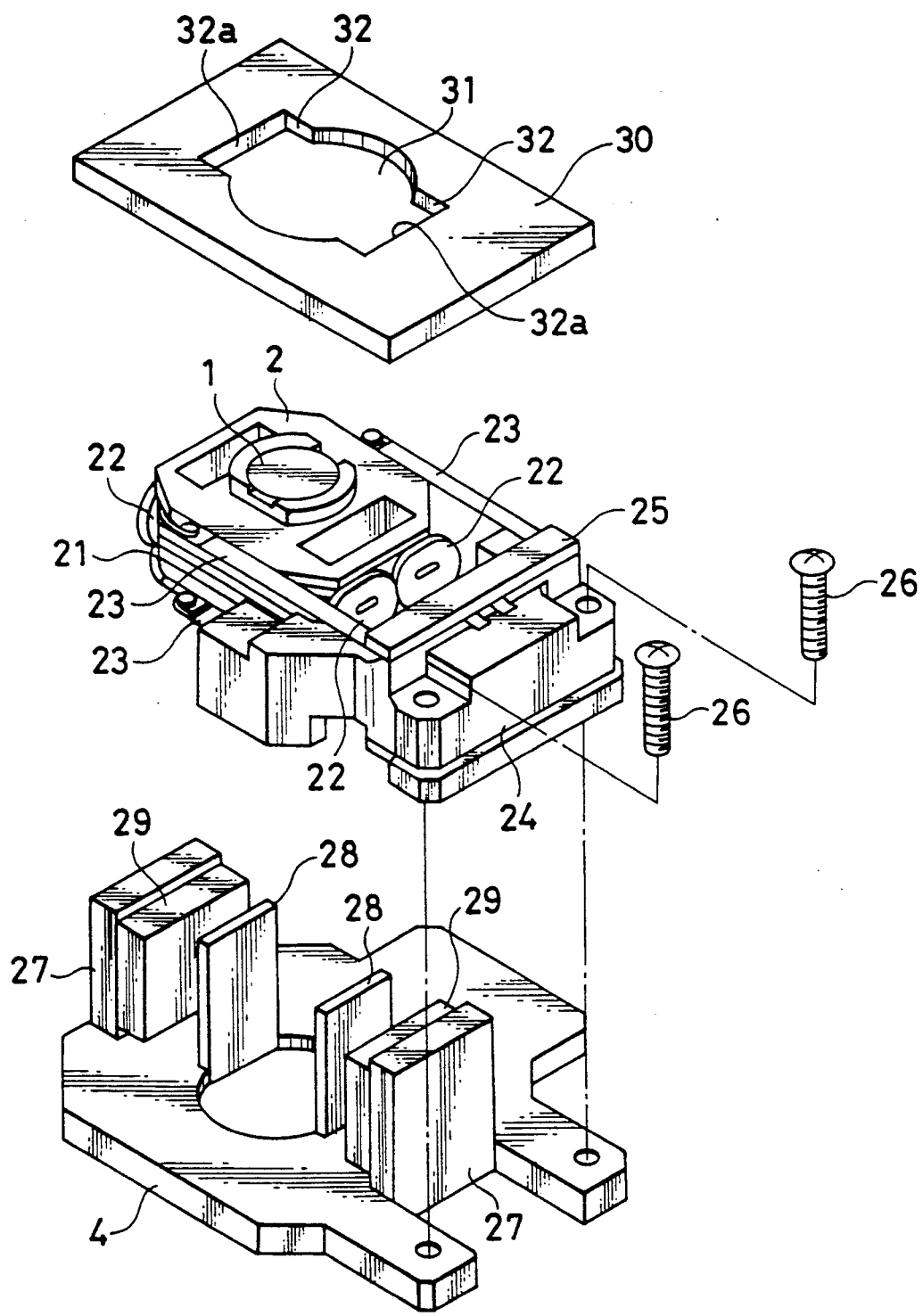
FIG. 6 is an exploded perspective view of the objective lens drive unit in the first embodiment.

FIG. 6 is an exploded perspective view of an objective lens drive unit in accordance with a first embodiment of the present invention. In FIG. 6, an electromagnetic coil 21 for focusing is wound around an outer circumference of a bobbin 2 supporting an objective lens 1. An electromagnetic coil 22 for tracking is adhesively fixed onto both sides of the bobbin 2. The bobbin 2 is supported by a leaf spring 23 in upper, lower, rightward and leftward positions of the objective lens drive unit. The leaf spring 23 can be deformed in focusing and tracking directions.

An end portion of the leaf spring 23 is fixed to a leaf spring fixing member 24 arranged on one side of the bobbin 2 while the leaf spring 23 is positioned by a leaf spring fixing bar 25. The leaf spring fixing member 24 is fixed by a screw 26 to an actuator base 4.

As explained with reference to FIG. 3, a pair of outer yokes 27 are integrally formed with the actuator base 4 by simple bending processing. A pair of inner yokes 28 are integrally formed with the actuator base 4 by bending and stretching processings such that the inner yokes 28 are thinner and higher than the outer yokes 27. A magnet 29 is fixed to each of the outer yokes 27.

An upper yoke 30 is formed by one sheet metal. A through hole 31 is disposed in a central portion of the upper yoke 30. A light beam transmitted through the objective lens 1 passes through this through hole 31. Recessed portions 32 are disposed in circumferential portions of this through hole 31 such that the recessed portions 32 are opposed to each other. Each of the recessed portions 32 has a linear bottom portion 32a. The linear portion 32a of each of the recessed portions 32 has a length approximately equal to a width of each of the inner yokes 28.

Figure 5:
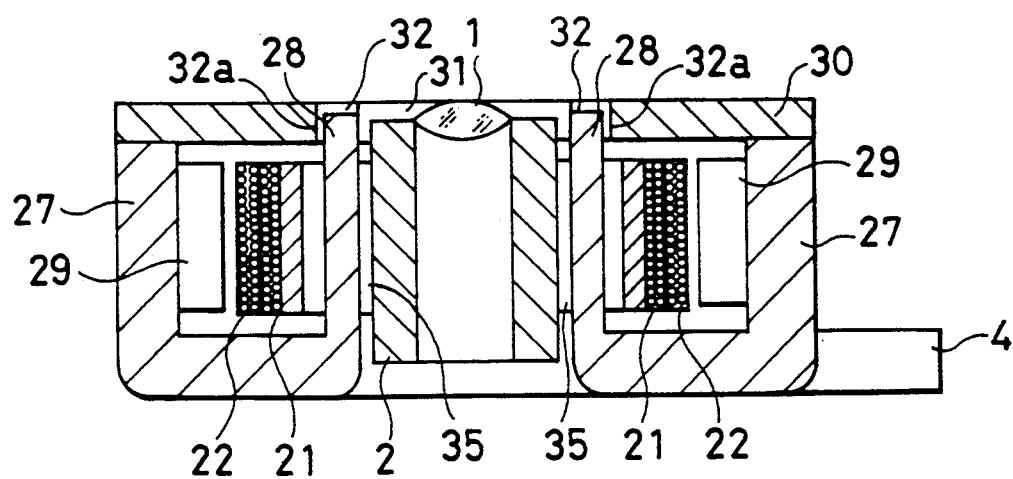
FIG. 5 is a cross-sectional view showing an assembling state of an objective lens drive unit in accordance with a first embodiment of the present invention.
Figure 7:
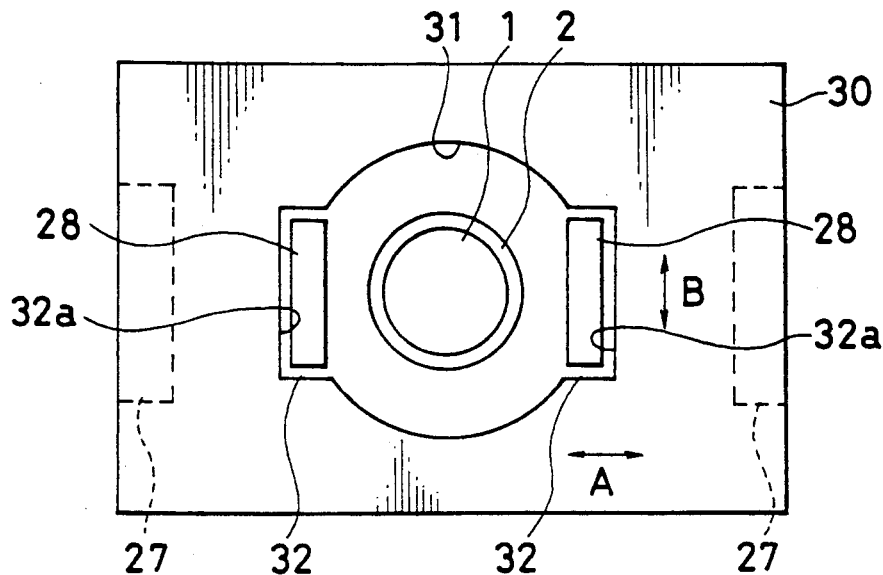
FIG. 7 is a plan view showing an assembling state of the objective lens drive unit in the first embodiment.

FIG. 5 is a cross-sectional view showing an assembling state of the objective lens drive unit in the first embodiment shown in FIG. 6. Each of the inner yokes 28 is inserted into a second through hole 35 formed on an inner side of the electromagnetic coils 21 and 22 of the bobbin 2 so that the electromagnetic coils 21 and 22 are opposed to the magnet 29. When each of the inner yokes 28 is inserted into a recessed portion 32 as shown in FIG. 7, the upper yoke 30 is positioned in the linear portion 32a in a thickness direction A and is positioned on both sides of the recessed portion 32 in a width direction B. If it is necessary to position the upper yoke 30 in only the thickness direction A, it is sufficient to form only the linear portion 32a in the through hole 31 and no recessed shape is required in the through hole 31.

Since each of the outer yokes 27 is formed by simple bending processing, an upper end face of each of the outer yokes 27 is flat and an accuracy in height of each of the yokes 27 is improved. Accordingly, the upper yoke 30 is preferably positioned in a height direction thereof by arranging and adhesively fixing the upper yoke 30 onto the upper end face of each of the outer yokes 27. Further, the upper yoke 30 is reliably fixed onto the upper end face of each of the outer yokes 27 since the upper yoke 30 is supported by the outer yokes 27 on their flat faces.

Figure 8:
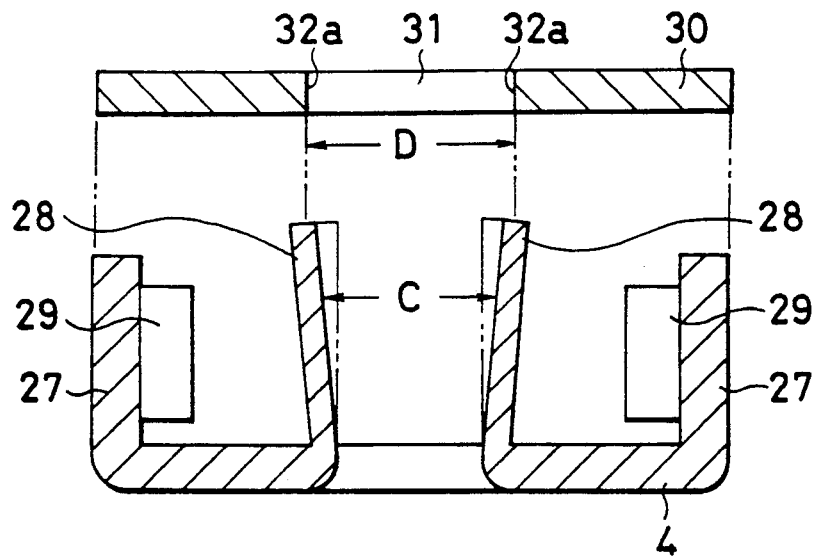
FIG. 8 is a cross-sectional view showing a main portion of an objective lens drive unit in accordance with a second embodiment of the present invention.

FIG. 8 is a cross-sectional view showing a main portion of an objective lens drive unit in accordance with a second embodiment of the present invention. In this second embodiment, a pair of inner yokes 28 are formed such that a distance C between side walls of the inner yokes 28 is slightly increased toward upper ends thereof. Further, a distance D between linear portions 32a in a through hole 31 of an upper yoke 30 is set such that both the inner yokes 28 are parallel to each other and are located in predetermined positions when the inner yokes 28 are inserted into the through hole 31.

Figure 9:
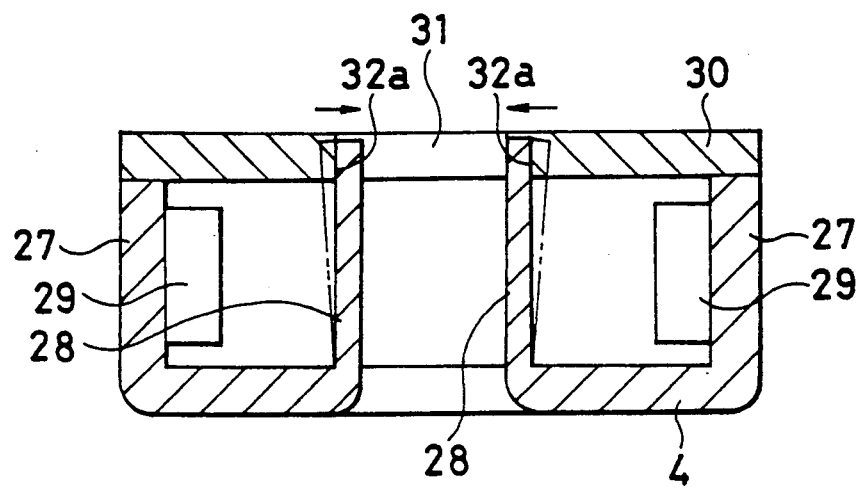
FIG. 9 is a cross-sectional view showing an assembling state of the objective lens drive unit in the second embodiment.

FIG. 9 is a cross-sectional view showing an assembling state of the objective lens drive unit in the second embodiment. The inner yokes 28 are inserted into the through hole 31 of the upper yoke 30 while the inner yokes 28 are flexed inward. At this time, the inner yokes 28 come in elastic contact with the respective linear portions 32a of the upper yoke 30 by elastic force for returning the inner yokes 28 outward. Accordingly, the upper yoke 30 and the inner yokes 28 come in close contact with each other so that loss of magnetomotive force of a magentic circuit is restrained.

Figure 10:
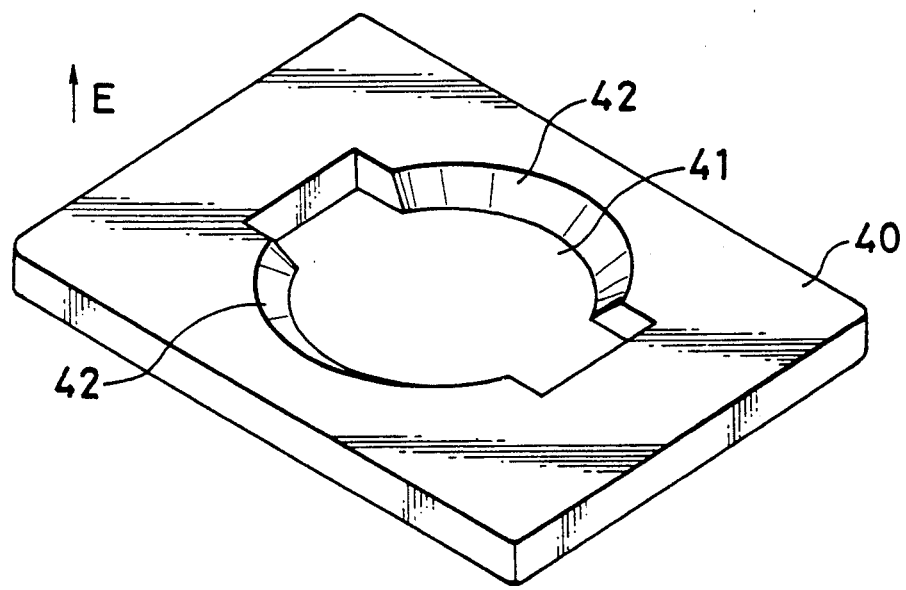
FIG. 10 is a perspective view showing an upper yoke in an objective lens drive unit in accordance with a third embodiment of the present invention.

FIG. 10 is a perspective view of an upper yoke in an objective lens drive unit in accordance with a third embodiment of the present invention. In this third embodiment, an upper yoke 40 has a tapering portion 42 widened on an arranging side E of an optical disk and formed in an edge portion of a through hole 41 through which a light beam passes.

Figure 11A:
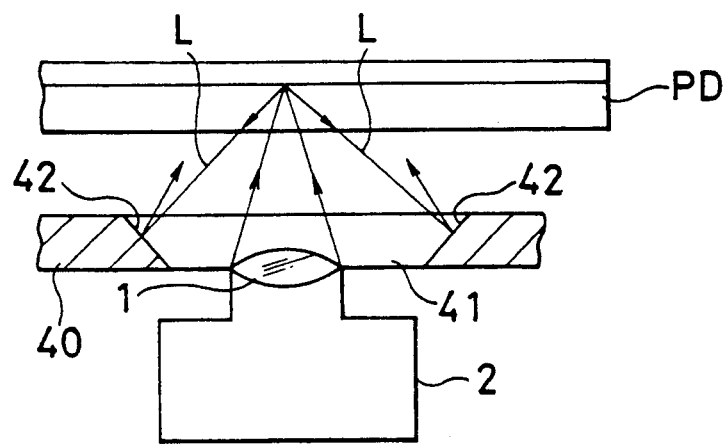
FIGS. 11a and 11b are views for explaining assembling states of the upper yoke in the third embodiment.
Figure 11B:
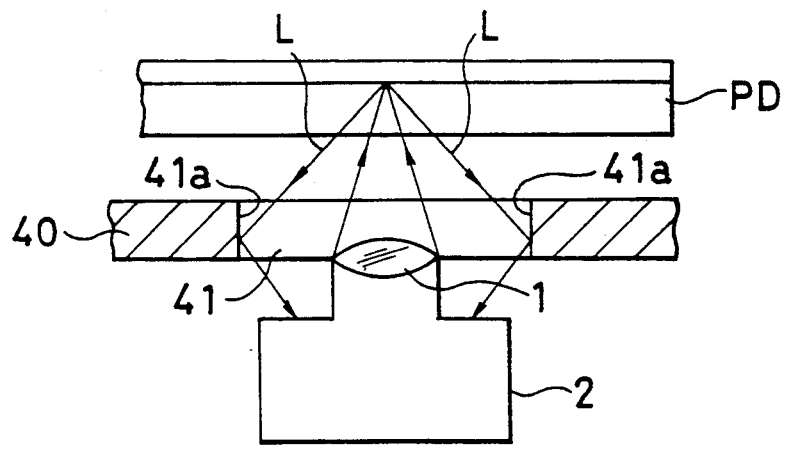

FIGS. 11a and 11b are views for explaining assembling states of the upper yoke. As shown in FIG. 11b, when no tapering portion 42 is formed, a light beam emitted through an objective lens 1 of a bobbin 2 is reflected on an optical disk PD. A portion L of this light beam is reflected on an edge portion 41a of the through hole 41 and is then transmitted below the upper yoke 40. Therefore, there is a fear that the detecting operation of an optical detecting means within the objective lens drive unit is adversely affected by this transmitted light portion L. However, since the tapering portion 42 is formed in this embodiment, the light beam portion L is reflected on the optical disk PD as shown in FIG. 11a and reaches an edge portion of the through hole 41. This light beam portion L is then reflected upward on the tapering portion 42 so that it is possible to prevent the light beam portion from being transmitted downward from the upper yoke 40.

Figure 12:
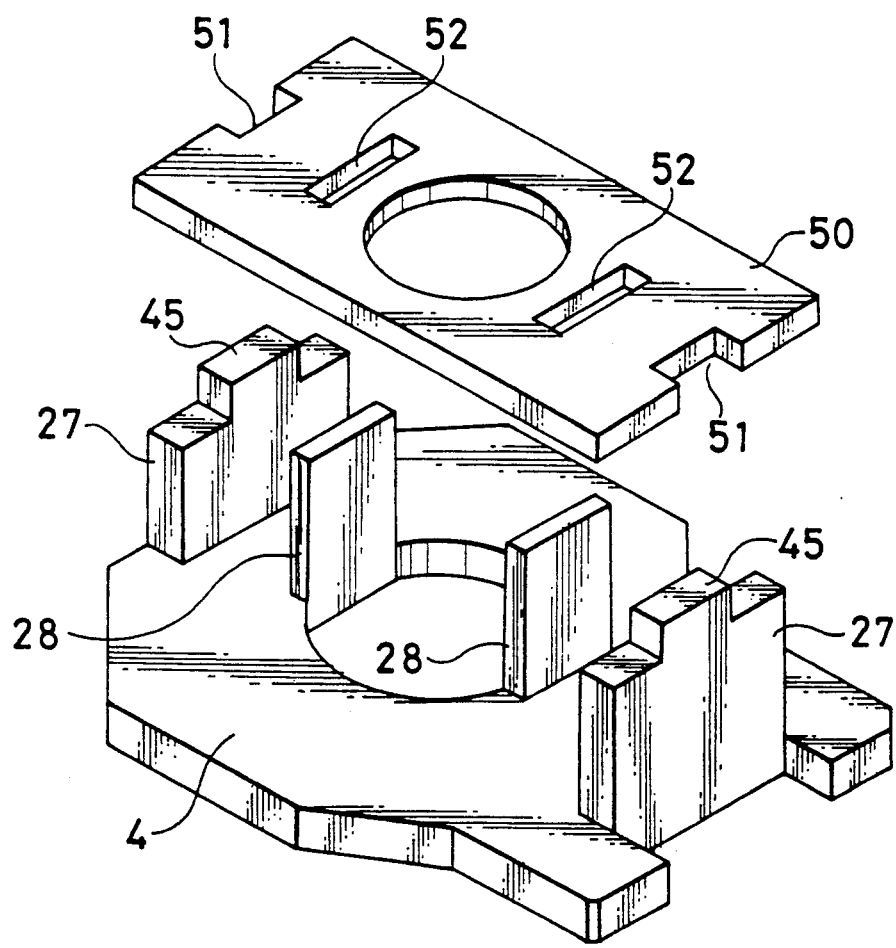
FIG. 12 is an exploded perspective view showing a main portion of an objective lens drive unit in accordance with a fourth embodiment of the present invention.

FIG. 12 is an exploded perspective view showing a main portion of an objective lens drive unit in accordance with a fourth embodiment of the present invention. In this fourth embodiment, a projected portion 45 is formed on an upper end face of each of outer yokes 27. A notch portion 51 is formed as a positioning portion in each of both side portions of an upper yoke 50. A slit hole 52 is formed in a portion of the upper yoke 50 corresponding to each of inner yokes 28.

Figure 13:
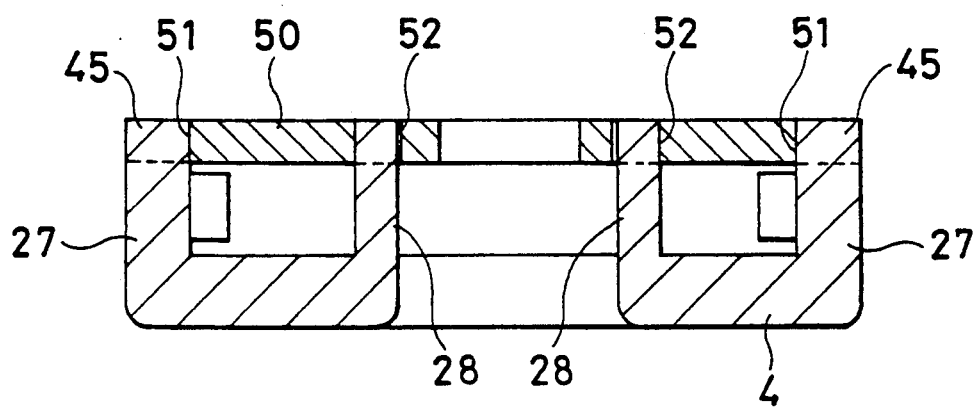
FIG. 13 is a cross-sectional view showing an assembling state of the objective lens drive unit in the fourth embodiment.

FIG. 13 is a cross-sectional view showing an assembling state of the objective lens drive unit in the fourth embodiment shown in FIG. 12. The notch portion 51 of the upper yoke 50 is engaged with the projected portion 45 of each of the outer yokes 27. Each of the inner yokes 28 is fitted and inserted into the slit hole 52. The upper yoke 50 is positioned by the outer yokes 27 precisely formed by only bending processing in comparison with the inner yokes 28 which are formed by bending and stretching processings with low accuracy. Further, a position of the upper yoke 50 is restricted by the inner yokes 28 so that the upper yoke 50 is positioned with high accuracy.

It is possible to prevent dispersion in magnetic field caused by a magnetic circuit and unnecessary force from being generated by this high accurate positioning. Accordingly, a change in thrust of an actuator and generation of harmful resonance can be restrained.

Figure 14:
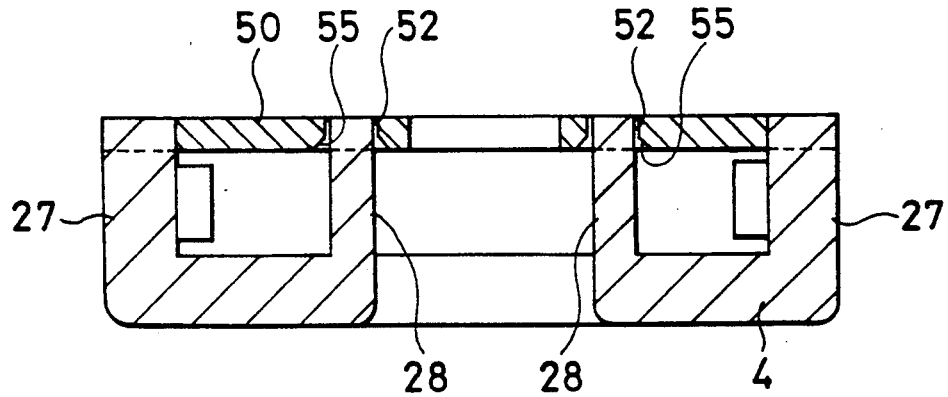
FIG. 14 is a cross-sectional view showing a modified example of the objective lens drive unit in the fourth embodiment.

FIG. 14 is a cross-sectional view showing a modified example of the objective lens drive unit in the fourth embodiment. A tapering portion 55 is formed on an inserting side of a slit hole 52 onto which each of inner yokes 28 is inserted. Each of the inner yokes 28 is easily inserted into the slit hole 52 by this tapering portion 55. A tapering portion may be formed in an upper end portion of each of the inner yokes 28 to easily insert each of the inner yokes 28 into the slit hole 52.

As mentioned above, in the present invention, an upper yoke is formed by one sheet metal and is arranged and fixed onto two outer yokes irrespective of inner yokes even when the inner yokes are molded by press working with low accuracy. Accordingly, the upper yoke can be accurately and reliably positioned in a height direction thereof. Each of the inner yokes is engaged with a linear or recessed portion formed in a through hole of the upper yoke. Accordingly, the upper yoke can be simply positioned so that the objective lens drive unit can be easily assembled. Further, each of the inner yokes comes in elastic contact with a circumferential portion of the through hole of the upper yoke so that the inner yokes and the upper yoke are close to each other. Accordingly, it is possible to reduce loss of electromotive force of a magnetic circuit. Further, a tapering portion is disposed in an edge portion of the through hole of the upper yoke such that light reflected on an optical information recording medium is transmitted outside the upper yoke by the tapering portion. Accordingly, it is possible to prevent optical detection, etc. below the upper yoke from being adversely affected by unnecessary reflected light. The upper yoke is positioned by the outer yokes and a positioning portion and an inclination of the inner yoke is restricted by the inner yokes and slit holes. Accordingly, the objective lens drive unit can be precisely and easily assembled. Thus, it is possible to provide an objective lens drive unit for simply, reliably and precisely fixing the upper yoke to the inner and outer yokes.

Many widely different embodiments of the present invention may be constructed without departing from the spirit and scope of the present invention. It should be understood that the present invention is not limited to the specific embodiments described in the specification, except as defined in the appended claims.

What is claimed is:

1. An objective lens drive unit comprising:
   a bobbin having an objective lens and supported such that the bobbin can be displaced;
   an electromagnetic coil disposed in the bobbin;
   a base;
   two sets of inner and outer yokes integrally formed with said base;
   a magnet disposed in each of the outer yokes such that the magnet is opposed to said electromagnetic coil;
   an upper yoke connected to upper ends of said inner and outer yokes and formed by one sheet metal; and
   a through hole formed in the upper yoke such that a light beam transmitted through said objective lens passes through the through hole,
   said base, said sets of inner and outer yokes, said magnet and said upper yoke forming a magnetic circuit for applying a magnetic field to said electromagnetic coil in association with each other, and
   said upper yoke being arranged and fixed onto an upper end face of each of said two outer yokes.

2. An objective lens drive unit as claimed in claim 1, wherein each of said inner yokes is formed to be higher than each of said outer yokes, and a linear portion engaged with each of said two inner yokes is formed in a circumferential portion of said through hole of the upper yoke.

3. An objective lens drive unit as claimed in claim 2, wherein the linear portion of said through hole is formed as a recessed portion such that a bottom portion of the linear portion has a length approximately equal to a width of each of said inner yokes.

4. An objective lens drive unit as claimed in claim 3, wherein a tapering portion is formed in an edge portion of said through hole such that the tapering portion is widened on an arranging side of an optical information recording medium.

5. An objective lens drive unit as claimed in claim 2, wherein a tapering portion is formed in an edge portion of said through hole such that the tapering portion is widened on an arranging side of an optical information recording medium.

6. An objective lens drive unit as claimed in claim 1, wherein said two inner yokes are formed such that an opposite distance between these two inner yokes is increased toward upper ends of the inner yokes from base portions thereof, and each of the inner yokes comes in elastic contact with a circumferential portion of said through hole.

7. An objective lens drive unit as claimed in claim 6, wherein a tapering portion is formed in an edge portion of said through hole such that the tapering portion is widened on an arranging side of an optical information recording medium.

8. An objective lens drive unit as claimed in claim 1, wherein a tapering portion is formed in an edge portion of said through hole such that the tapering portion is widened on an arranging side of an optical information recording medium.

9. An objective lens drive unit as claimed in claim 1, wherein said upper yoke has a positioning portion engaged with an upper end portion of each of said outer yokes and has a slit hole into which an upper end portion of each of said inner yokes is fitted and inserted.

* * * * *